Sept. 29, 1959   R. P. KNAPP ET AL   2,906,500
COMPLETION OF WELLS UNDER WATER
Filed Dec. 21, 1956   5 Sheets-Sheet 3

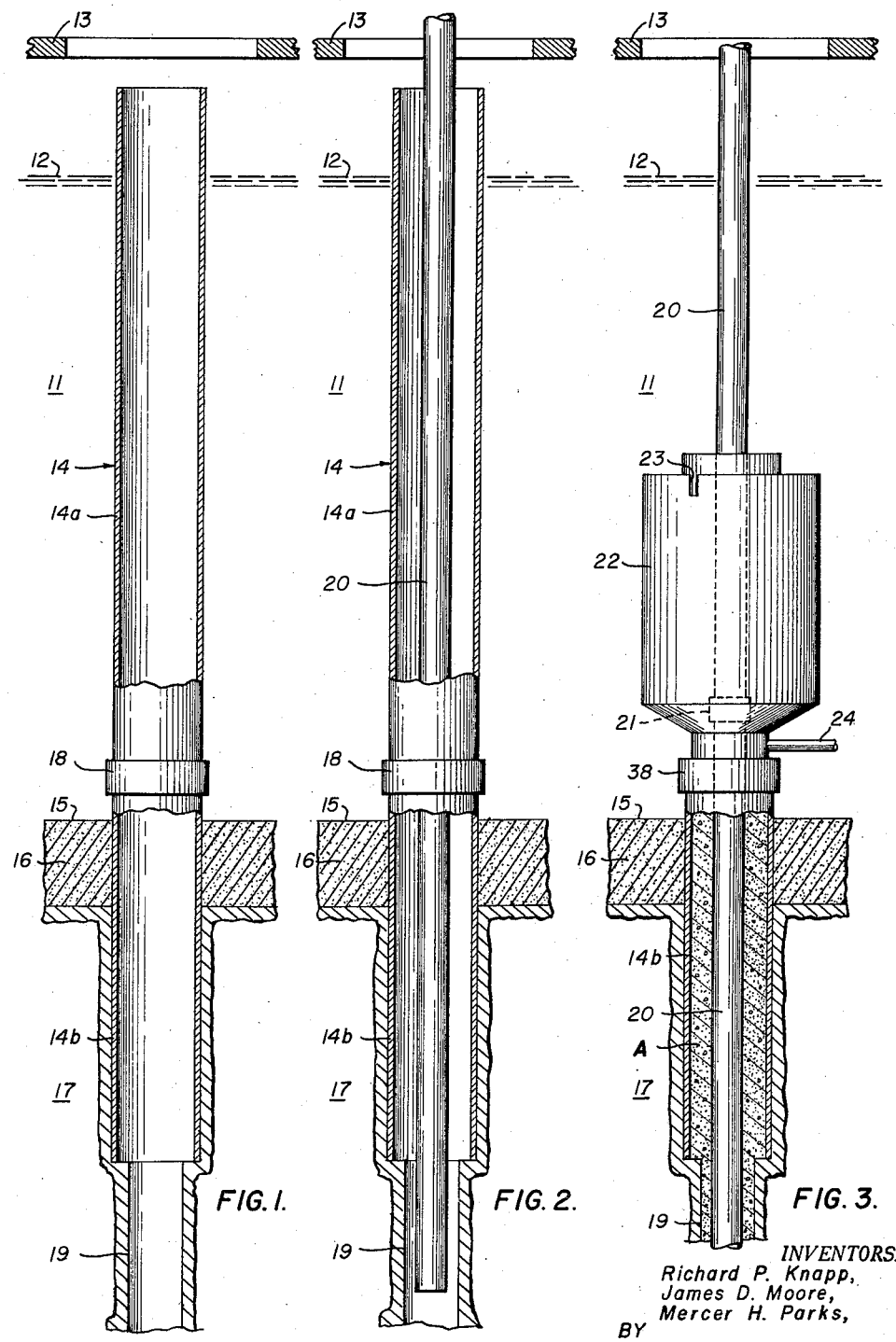
INVENTORS.
Richard P. Knapp,
James D. Moore,
Mercer H. Parks,
BY
ATTORNEY.

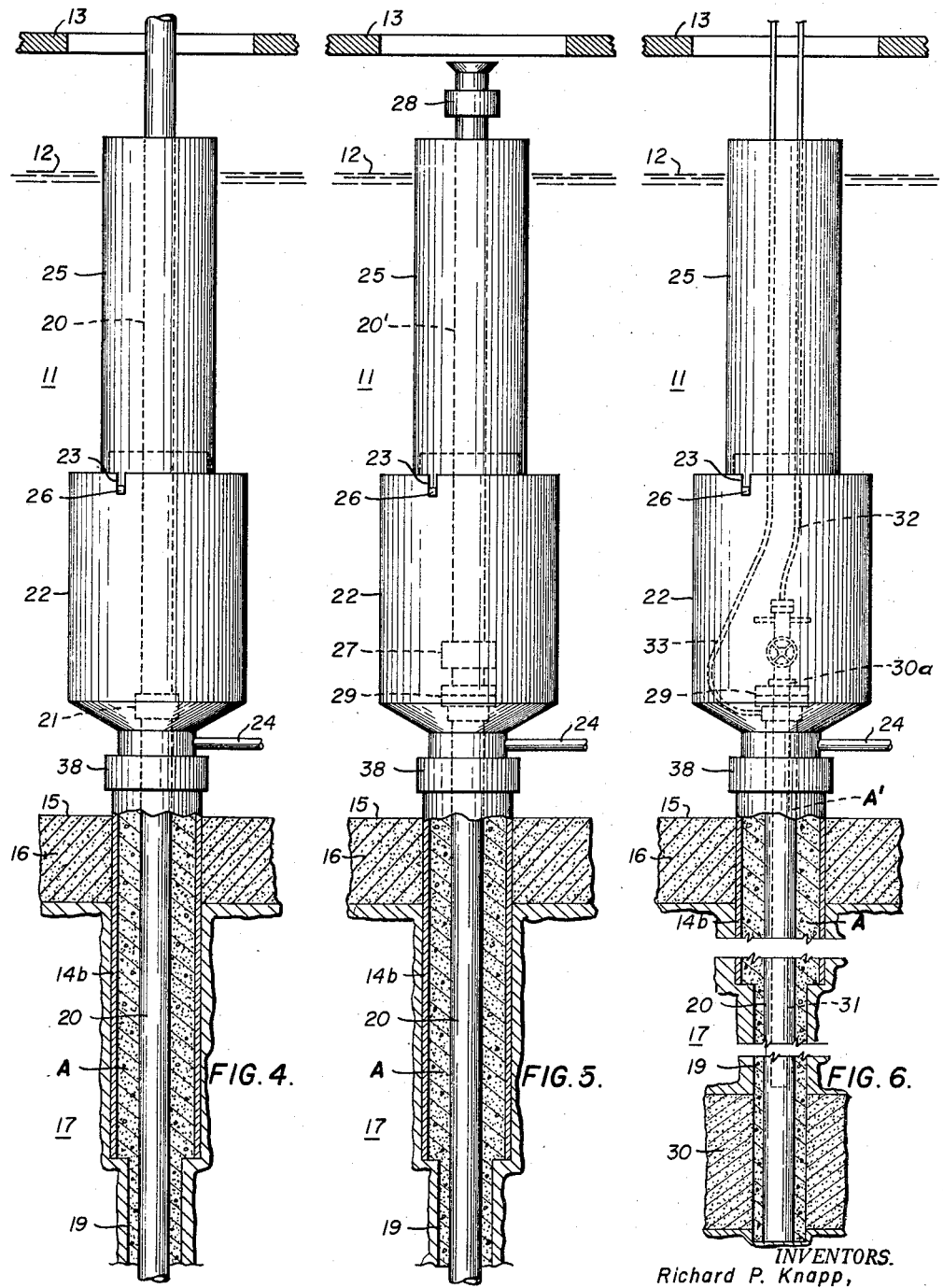

INVENTORS.
Richard P. Knapp,
James D. Moore,
Mercer H. Parks,
BY
ATTORNEY.

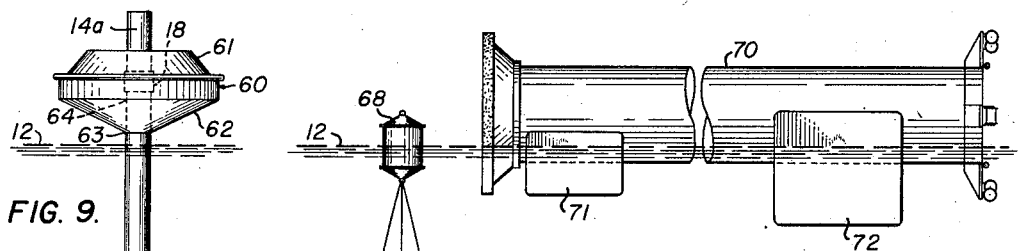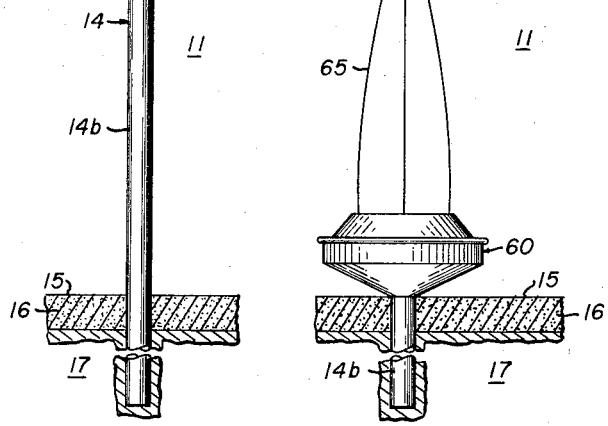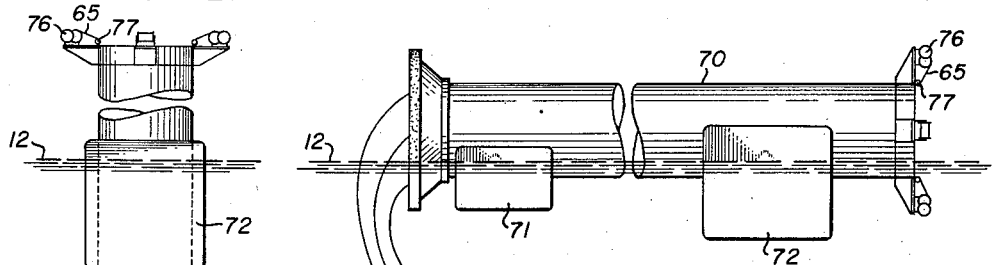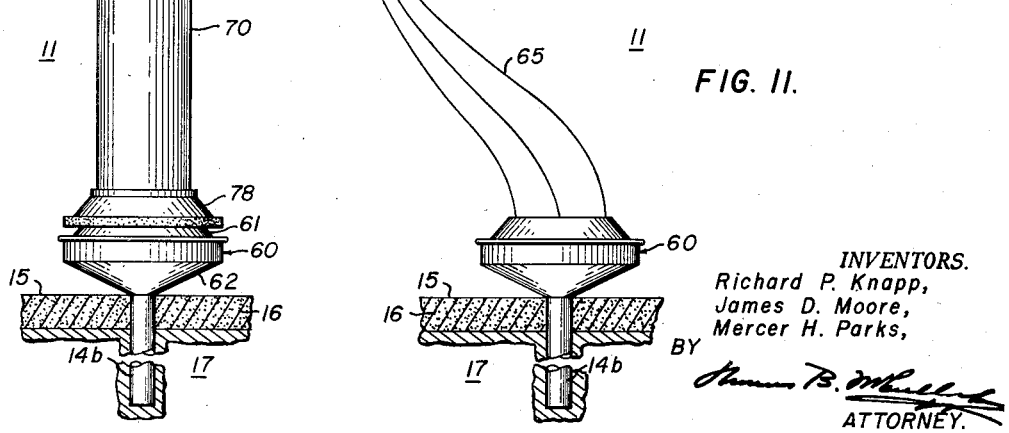

Sept. 29, 1959  R. P. KNAPP ET AL  2,906,500
COMPLETION OF WELLS UNDER WATER
Filed Dec. 21, 1956  5 Sheets-Sheet 5
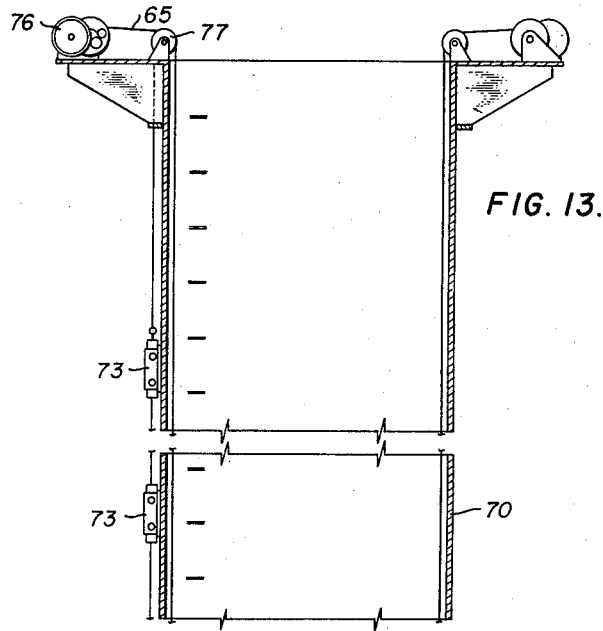
FIG. 13.
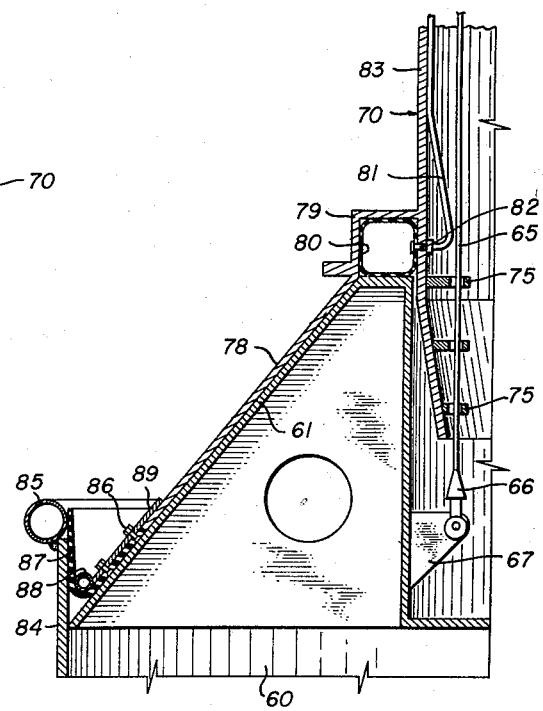
FIG. 14.
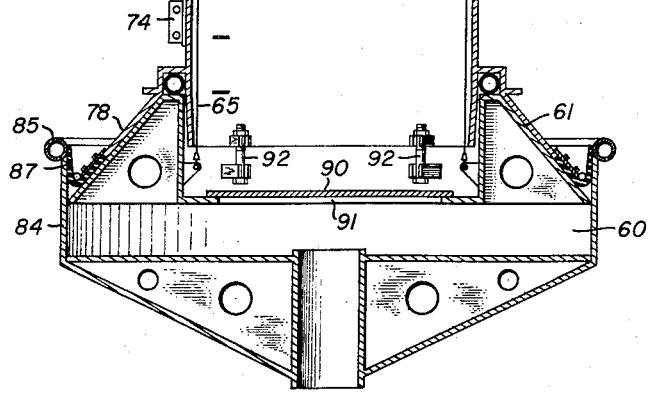
INVENTORS.
Richard P. Knapp,
James D. Moore,
Mercer H. Parks,
BY
ATTORNEY.

United States Patent Office 2,906,500
Patented Sept. 29, 1959

2,906,500

COMPLETION OF WELLS UNDER WATER

Richard P. Knapp, James D. Moore, and Mercer H. Parks, Houston, Tex., assignors, by mesne assignments, to Jersey Production Research Company, Tulsa, Okla., a corporation of Delaware Application December 21, 1956, Serial No. 629,878

16 Claims. (Cl. 255—1.8)

The present invention is directed to a method for completing and servicing a well below the surface of a body of water. More particularly, the invention is directed to apparatus and method for completing and servicing a well below the surface of a body of water. In its more specific aspects, the invention is directed to means for enclosing the wellhead below the surface of a body of water.

The invention may be described as apparatus for completing and servicing a well below the surface of a body of water in which the well penetrates a subsurface earth interval and in which the well has a surface pipe extending above the water bottom but below the water surface. A first vessel is fixedly and sealingly attached by its lower end to the upper end of the surface pipe, and is designed to enclose wellhead equipment attached to the upper end of the surface pipe and provide a chamber for workmen. The first vessel has its upper end extending below the water surface with its lower end connected to the surface pipe. A second vessel having openings on its upper and lower ends is releasably and sealingly attached by its lower end to the upper end of the first vessel. The second vessel extends with its upper end above the water surface and is provided with means in its upper end for access thereto by workmen. Flexible connections are provided which extend through the first and second vessels and are connected to the wellhead equipment. The second vessel is positioned on and removed from the first vessel by moving the second vessel over the flexible lines. The first vessel which is attached fixedly to the surface pipe preferably has conical upper and lower ends while the second vessel preferably has an outwardly flaring conical surface which is adapted to seat on the inwardly extending conical upper surface of the first vessel.

The present invention also provides a method for completing and servicing a well penetrating a subsurface earth interval in which the well is drilled below a body of water and has its surface pipe extending above the water bottom but below the water surface. In the method, the upper end of the surface pipe is enclosed to provide a confined space free of water surrounding the upper end of the surface pipe and extending above the water surface in open communication with the atmosphere. Wellhead equipment is installed on the upper end of the surface pipe in the confined space while open to the atmosphere and thereafter flow lines are connected to the wellhead equipment in the confined space. The confined space is then closed and reduced in area to enclose the wellhead equipment below the water surface. The confined space may then be filled with a non-corrosive fluid and thereafter a buoyant marker is attached to the well. The well is then produced through one of the flow lines from the subsurface interval. When it is desired to service or recomplete the well, flow from the subsurface interval is terminated, the confined space is increased in area to extend again above the water surface, the non-corrosive fluid is removed from the confined space, and then the servicing or recompleting operation is conducted from the confined space.

The present invention will be further illustrated by references to the drawing in which:

Fig. 1 is a showing of the conductor pipe in a surface hole of a well being drilled from a drilling platform in a body of water;

Fig. 2 is a showing of running the surface casing in the well of Fig. 1;

Fig. 3 illustrates the cementing of the well of Figs. 1 and 2 and the installation of a completion chamber on the surface casing;

Fig. 4 illustrates the placement of a second chamber or an access tube on the first or working chamber;

Fig. 5 shows the placement of blowout preventers above the two chambers and in the working chamber preliminary to further drilling of the well;

Fig. 6 illustrates the well after drilling has been completed and wellhead equipment and flow lines installed;

Fig. 9 illustrates the placement of a modified lower chamber;

Fig. 10 shows the lower chamber submerged and the access tube or caisson floated into position;

Fig. 11 is a showing of the cable arrangement for connecting the caisson to the lower chamber;

Fig. 12 shows the caisson arranged on the lower chamber;

Fig. 13 is a sectional view of the caisson connected to the lower chamber; and

Fig. 14 is an enlarged fragmentary view of the device shown in Fig. 13.

Figure 8:
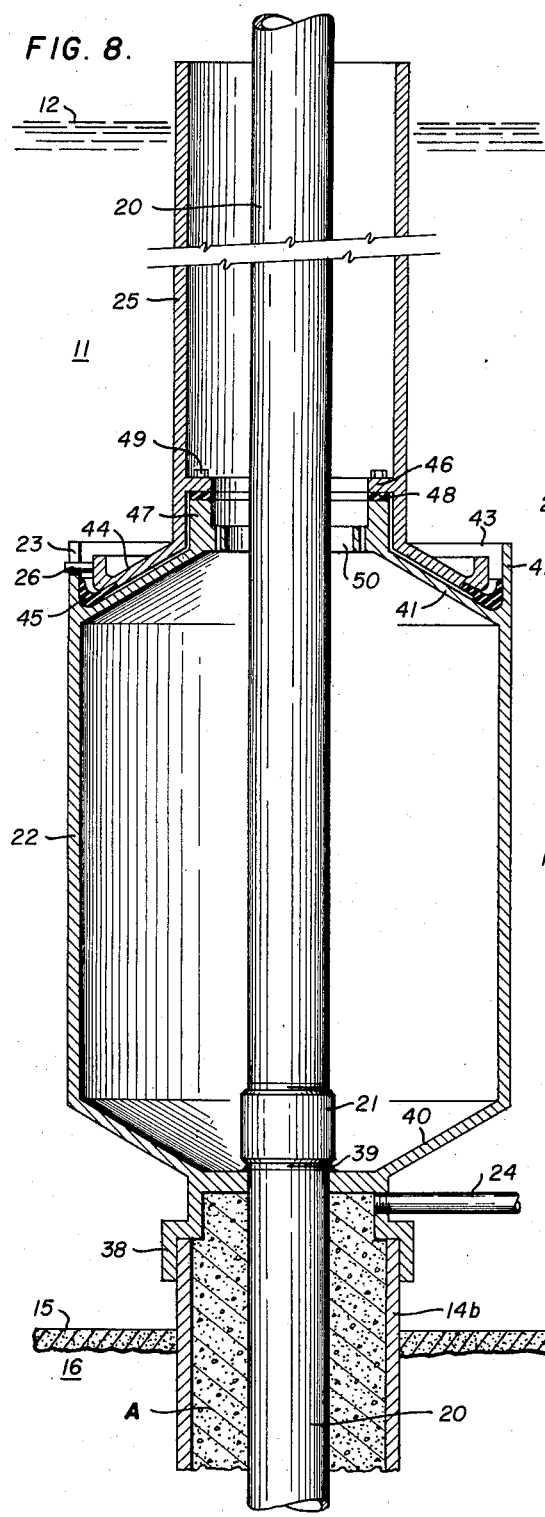
Fig. 8 is a sectional view of the chambers of Figs. 1 to 7.

Referring now to the drawing in which identical numerals will be employed to designate identical parts, and to Figs. 1 to 7, in sequence, numeral 11 designates a body of water having a surface 12 in which a drilling platform 13 is located. A conductor pipe 14 has been driven or washed in to penetrate the water bottom 15 and incompetent material 16 or mud and to terminate in a formation 17 which has sufficient strength for rigidity of the conductor pipe. The conductor pipe 14 is comprised of an upper section 14a and a lower section 14b suitably interconnected by a releasable connection 18 which may be a collar or a safety joint. The surface hole 19 is then drilled through the conductor pipe 14 from the drilling platform 13, as shown.

In Fig. 2 the surface casing 20 is then run through the conductor pipe 14 into the surface hole 19. The surface casing 20 extends to the platform 13 and is provided with a coupling 21 which is loosened. Arranged over the upper end of the surface casing 20 is an underwater completion chamber 22 provided with a slot or other indexing means 23. This completion chamber 22 is placed on the conductor pipe 14 and secured to the surface casing and to the conductor pipe by means of a coupling member 38. Alternatively, the chamber 22 may be placed over the casing 20. It is to be noted in Fig. 3 that the upper section 14a of the conductor pipe 14 has been removed prior to placement of the chamber 22 on the surface casing 20.

Cement is then run down the surface casing 20 and forced up the annulus A between the conductor pipe 14b and the open hole 19 to cement the casing 20 therein. The completion chamber 22 is suitably provided with a discharge tube or conduit 24 for discharging the excess cement which is forced up the annulus A to cement the surface casing 20 in the conductor pipe 14b.

After the cementing of the casing 20 in the conductor pipe 14b and after the attachment of the underwater completion chamber 22 to the upper end of the surface casing 20 and the conductor pipe 14b, an access tube or upper chamber 25 is lowered over the upper section of the surface casing 20 and attached to the underwater completion chamber 22 by means of the lug 26 being arranged in the vertical indexing slot 23.

It will be remembered that the coupling 21 has been loosened and after placement of the tube or chamber 25, the upper section of the surface casing 20 is removed by raising same through the chambers or vessels 22 and 25. Thereafter the vessels 22 and 25 are dewatered and then the blowout preventers 27 and 28 and casinghead 29 are installed on a pipe such as 20' and connected in place through the vessels 25 and 22, placing the well in condition for drilling through the surface casing 20. The well is then drilled in a conventional manner through the surface casing 20 until it penetrates at least a subsurface interval such as 30 and preferably at least until it penetrates a plurality of subsurface intervals, such as 30, which may be productive of hydrocarbons, such as oil and gas, and from which oil and/or gas may be produced either simultaneously or separately. In short, it is contemplated in the practice of the present invention that the well may be completed for dual or multiple completions. Furthermore, it is contemplated that the tubing not shown completely in the apparatus of the present invention will be run into the casing and set with its lower end above a plurality of formations, zones, strata, intervals, or horizons, such as 30, for employment of a tubing extension and the like in the so-called permanent well completion technique.

In the permanent well completion technique, the tubing of a well is set permanently in place above an uppermost of a plurality of producing horizons, such as 30, and thereafter the well is completed by running in tools, such as gun perforators and the like, through the tubing with operations, such as fracturing, acidizing, cementing, stimulating, flooding, and the like also being conducted through the tubing which is set above an uppermost of the producing horizons. In any event, in the showing of Fig. 6, the well has been drilled to penetrate a plurality of horizons, such as 30, the surface pipe 20' and blowout preventers 28 and 27 removed and a Christmas tree 30a arranged on the casinghead 29, the tubing 31 being arranged within the casing 20 with its lower open end above the plurality of producing horizons 30. Flow lines 32 and 33 are attached, respectively, to the Christmas tree 30a and to the casinghead 29 to communicate with the annulus A' between the casing 20 and the tubing 31.

It will be noted that the flow lines 32 and 33 are and may be curved and/or flexible conduits which extend through the chambers 22 and 25 and may be attached to a suitable hoisting means, such as the travelling block in the derrick not shown, on platform 13. Chambers 22 and 25 are then flooded with water. The chamber 25 is then removed. Prior to removing the chamber 25 and prior to breaking the seal between the chamber 25 and the chamber 22, a cover plate, not shown, is run in over the flexible conduits 32 and 33, which are sealed therein, and employed to close the upper end of the chamber or vessel 22. The chamber 25 is then raised over the flexible conduits 32 and 33 and removed to platform 13.

Figure 7:
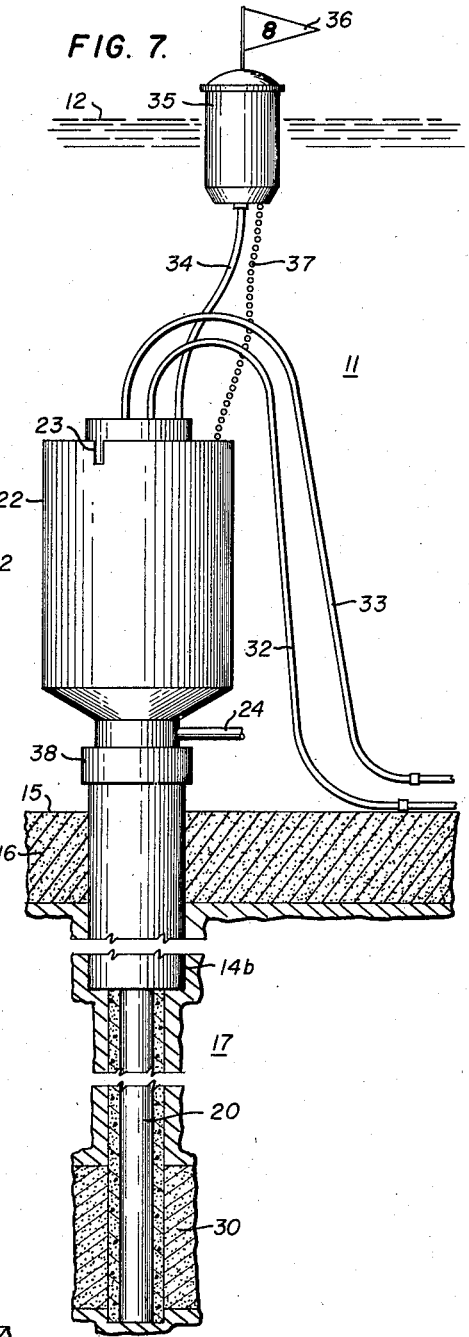
Fig. 7 shows the well after the removal of the access tube or second chamber.

In Fig. 7 it will be noted that the platform 13 and its attendant structure and the access or upper chamber 25 have been removed. The flexible conduits 32 and 33 are connected to flow pipes which may extend to shore or to suitable barges or other containers. A control line, such as 34, may be attached to the chamber 22 and to a buoy 35 which may carry a suitable marker, such as a flag or pennant 36. An anchor chain 37 interconnects the buoy 35 and the chamber 22. Likewise, anchor chains may be attached to lines 32 and 33.

It is contemplated that the chamber 22 may be filled with a suitable non-corrosive fluid or liquid which may have a specific gravity greater than the specific gravity of sea water. Examples of this non-corrosive fluid are aqueous solutions of sodium bichromate, sodium bicarbonate, aqueous ammonical solutions containing sulfonated fatty acids, bone oil, aqueous solutions of sodium hydroxide, ammonium hydroxide, and the like.

It is contemplated that, after the well has been completed and the equipment installed, such as in Fig. 7, further servicing operation may be conducted by running a flexible tubing extension, such as described in Serial No. 523,964, filed July 25, 1955, for Gilbert H. Tausch, through the flow line 32 and through the tubing 30 for seating and sealing in the lower end thereof.

In Fig. 8 a sectional view of the chambers 25 and 22 is presented. It is to be noted that a coupling member 38 forms part of the lower end of the chamber 22 which fits over the conductor pipe 14b and that the surface casing 20 is connected to the chamber 22 as shown at 39. The lower end of the chamber 22 is provided in the shape of a cone 40 while the upper end has an inwardly flaring cone 41 with an upward annular ring 42 to form a space 43.

The lower end of the vessel 25 is in the form of an annular outwardly flaring cone 44 having the lug 26 attached thereto for engagement with the vertical indexing slot 23. Arranged between the cones 41 and 44 adjacent the lower ends thereof is a cup sealing member or packing means 45 which provides a seal between the vessels 25 and 22. An inwardly extending shoulder 46 in the lower portion of the vessel 25 is designed to seat on an annular upstanding member 47 of the chamber 22 to serve as a connection between the vessels 22 and 25. A sealing or packing member 48 provides a seal between the shoulder 46 and the member 47, the shoulder 46 being connected to the member 47 by suitable connection means such as a hex-headed bolt or screw 49.

Referring now to Fig. 9, a first chamber, such as 60, having conical upper and lower ends 61 and 62, is attached to a conductor pipe 14, such as by welding at 63 and 64; pipe 14 is made up of a lower section 14b and an upper section 14a which are connected together by a suitable coupling, such as 18. Chamber 60 serves in a similar manner to chamber 22 of the preceding figures. The chamber or vessel 60 and the sections 14a and 14b are driven to penetrate the water bottom 15 and incompetent earth formation 16 and to terminate in a formation 17. Flexible guide cables, such as 65, are attached to the chamber or vessel 60, as shown more clearly in Figs. 13 and 14, by connecting means 66 including a bracket 67. The guide cables 65 extend to the water level 12 and are there connected to a suitable buoy, such as 68. As shown in Fig. 10, the section 14a is uncoupled and the chamber 60 and the section 14b are placed or arranged just above the mud line such that the chamber 60 is below the water level 12.

A second vessel or caisson 70 is floated into position adjacent the buoy 68 by means of floats 71 and 72 which are releasably attached to caisson 70 by float release mechanisms 73 and 74, respectively, as shown in Fig. 13. Caisson 70 is similar to chamber 25 and functions similarly thereto.

The cables or flexible means 65 are released from the buoy 68 and are arranged through cable guides 75 to extend through the caisson or vessel 70 and are attached to a suitable hoisting mechanism, such as a winch 76 on the caisson 70. The cables 65 are extended over a pulley, such as 77, for ease of operation.

Alternatively the caisson 70 may be run in over the buoy 68 and the procedure carried out as has been described.

As shown specifically in Fig. 11, after the guide cables have been placed in the cable guides 75 and attached to the winch 76, the floats 71 are released from the cradle arrangement by float releasing mechanism 74 which allows the caisson 70 to swing to a vertical position as shown in Fig. 12. The buoyancy of the floats 72 is then adjusted to provide a sufficient positive buoyancy to allow the caisson 70 to be maneuvered into position over the chamber 60. It is to be noted that the lower end of the caisson 70 has an outwardly flaring annular member 78 which is designed to seat on the inwardly extending or conical end surface 61 of the chamber 60. With operation of the winch 76, the caisson 70 is pulled into position and placed on the chamber 60 as shown in Fig. 12.

The lower end of the caisson 70 is provided with a recess portion 79 in which is arranged a pneumatic sealing member 80 connected by a conduit 81 to a source of pressure. This conduit 81 connects to the sealing member 80 by connecting means 82 which extends through the wall 83 of the caisson 70.

The upper end of the chamber or vessel 60 is provided with an upstanding member 84 and a peripheral tubular member 85 which is connected to member 84 such as by welding. The outwardly flaring member 78 has attached thereto by suitable attaching means 86 a flexible sealing member 87 which is designed to seat against the inner surface of members 84 and 85 and against the outer surface of end member 61. To provide a cup shape, the member 87 extends around a tubular member 88 affixed to a sleeve member 89 which, in turn, is affixed to the member 78 and to the sealing member 87. By virtue of the sealing means 87 and the pneumatic sealing member 80 a positive seal is effected between the caisson 70 and the vessel 60. The lower end of the caisson 70 is provided with a suitable cover plate 90 which serves to close the opening 91, which on removal of plate 90 provides access to the chamber or vessel 60. After the caisson 70 has been arranged on the vessel 60, it may suitably be attached thereto by a suitable attaching means 92.

The modification of Figures 9 to 14 is employed similarly to that of Figures 1 to 8 with vessels 60 and 70 being freed of water for access thereto as has been described with respect to the mode of Figures 1 to 8. As the water is removed from the vessels 60 and 70, a differential pressure seal is effected by the hydrostatic head of water against the cup-shape sealing member 87.

Flexible pipe connections may be affixed to the wellhead connections as shown in Figs. 1 to 8. The cables 65 serve as flexible connecting means but flexible pipe connections are also suitably employed either before or after placement of the second vessel on the first vessel.

In practicing the present invention a conductor casing of a diameter adequate for self-support and for drilling purposes is driven through the sea bottom or the bottom of the water location to a suitable soil penetration and provided with a releasable connection as shown in the description taken with the drawing. This releasable connection may be positioned at a predetermined level beneath the given water surface. The level for the releasable connection may be determined by conditions at the well site with the connection being at or near the sea bottom for water depth less than 70 feet and to be about 70 feet below the given water surface where water depths exceed 70 feet. The connection may be a left-hand threaded safety joint which will permit disengagement by right-hand engagement of the upper section, such as 14a of the conductor casing. Thereafter the surface hole is drilled in a conventional manner with drilling fluid and cuttings being returned through the annulus between the drill pipe and the conductor casing annulus. Surface casing, such as 20, is then run to place the lowermost end below the releasable connection, such as 18, and thereafter the upper section, such as 14a, of the conductor casing is removed at the releasable connection and withdrawn from the well over the surface casing 20 as has been shown. The subsequent operations are as have been described in the description taken with the drawing.

The present invention may suitably be used for workover and other recompletion operations. In these operations, after the well has been completed and produced as shown with respect to Fig. 7, the buoy 35 would be removed and the flexible conduits 32 and 33 would be retrieved. Thereafter the vessel 25 would be lowered over the conduits 32 and 33 and attached by the lug 26 in the slot 23. The vessel 25 would be attached securely but releasably by bolts 49 to the vessel 22 after the two vessels have been dewatered. Thereafter the hatch, not shown, which covers the opening 50 in the vessel 22 would be removed and any liquid would then be pumped from the vessel 22. Workmen could then enter the vessels 25 and 22 to perform all operations which are necessary therein. For example, a lubricator could be attached to the Christmas tree 30 and well servicing operations, such as gun perforating, cementing, and the like may be performed. Also after perforating or re-perforating the tubing extension may be used for conducting cementing and the like operations. For example, the tubing extension may be used for removing sand and other removable debris from the well. After such operations are conducted with the flow lines in the position as shown in Fig. 6, the vessel 25 would again be removed and the buoy 35 attached as shown in Fig. 7, the vessel 22 having previously been closed and filled as desired with the non-corrosive fluid. Production from a desired subsurface interval would then be resumed or initiated.

The present invention is of considerable utility and advantage in that it provides method and apparatus for completing oil and gas wells beneath the surface of water at inland marine or offshore operations without requiring the provision of a permanent platform and allowing all wellhead equipment to be submerged below the surface of the water and enclosed in a suitable chamber to which access may be had.

In the present invention all drilling, completing, and well servicing operations are conducted without requiring use of free or attended diving personnel to perform any of the usually required operations. This is of considerable advantage since it eliminates the need for divers and their consequent exposure to the hazards of diving.

The nature and objects of the present invention having been completely described and illustrated, what we wish to claim as new and useful and to secure by Letters Patent is:

1. Apparatus for completing and servicing a well below the surface of a body of water and penetrating a subsurface earth interval and having a surface pipe extending above the water bottom but below the water surface which comprises a first vessel fixedly and sealingly attached by its lower end to the upper end of the surface pipe and adapted to enclose well head equipment attached to the upper end of said surface pipe and providing a chamber for workmen, said first vessel having its upper end extending below the water surface, a vertically arranged elongated second vessel having openings on its upper and lower ends releasably and sealingly attached by its lower end to the upper end of the first vessel, said second vessel being of sufficient length to extend with its upper end above the water surface and being provided with means in its upper end for access thereto by workmen, said vessels being provided with flexible guide connections attached to said first vessel and extending through said second vessel for positioning said second vessel on said first vessel, the upper end of the first vessel having an inwardly projecting conical surface and the lower end of the second vessel having an outwardly projecting conical surface, said outwardly projecting conical surface resting on said inwardly projecting conical surface when the second vessel is positioned on the first vessel, and sealing means exposed to the hydrostatic head of water for sealing between said vessels.

2. A method for placing a buoyant first elongated vessel on a submerged second vessel in a vertical position on bottom of a body of water, the first vessel being open on both ends, which comprises floating the first vessel in a horizontal position to a point generally above said second vessel, decreasing the buoyancy of the first vessel adjacent one end, and flexibly guiding said one end of the first vessel downwardly to a vertical position over the second vessel whereby the first vessel has said one end releasably placed on the second vessel with its other end extending above the water surface.

3. A method for placing and removing a first elongated vessel on and from a submerged second vessel on bottom of a body of water, the first vessel being open on both ends, which comprises providing buoyancy to the first vessel, floating the first vessel to a point generally above said second vessel, decreasing the buoyancy of the first vessel, flexibly guiding one end of the first vessel downwardly over the second vessel whereby the first vessel has one end releasably placed on the second vessel with its other end extending above the water surface, freeing at least said first vessel of water whereby access at least to said first vessel is provided, increasing the buoyancy of said first vessel, guiding said one end of the first vessel upwardly to the water surface, and then floating the first vessel away from the point above said second vessel.

4. A method for placing a buoyant first elongated vessel on a submerged second vessel on bottom of a body of water, the second vessel having a plurality of flexible guide lines attached thereto, the guide lines extending to the surface of the body of water and the first vessel being open on both ends, which comprises floating the first vessel to a point generally above said second vessel, extending said guide lines through said first vessel, attaching said guide lines to the first end of said first vessel, decreasing the buoyancy of the first vessel, and then decreasing the effective length of said guide lines whereby the second end of said first vessel is guided over the upper end of the second vessel and releasably placed thereon with its first end extending above the surface of the water.

5. A method for placing a buoyant first elongated vessel on a submerged second vessel on bottom of a body of water, the second vessel having a plurality of flexible guide lines attached thereto, the guide lines extending to the surface of the body of water and the first vessel being open on both ends, which comprises floating the first vessel to a point generally above said second vessel, extending said guide lines through said first vessel, attaching said guide lines to the first end of said first vessel, decreasing the buoyancy of the first vessel, then decreasing the effective length of said guide lines whereby the second end of said first vessel is guided over the upper end of the second vessel and releasably placed thereon with its first end extending above the surface of the water, and then removing water at least from the first vessel.

6. A method for placing and removing a first elongated vessel on and from a submerged second vessel on bottom of a body of water, the second vessel having a plurality of flexible guide lines attached thereto, the guide lines extending to the surface of the body of water and the first vessel being open on both ends, which comprises providing buoyancy to the first vessel, floating the first vessel to a point generally above said second vessel, extending said guide lines through said first vessel, attaching said guide lines to the first end of said first vessel, decreasing the buoyancy of the first vessel, then decreasing the effective length of said guide lines whereby the second end of said first vessel is guided over the upper end of the second vessel and releasably placed thereon with its first end extending above the surface of the water, then removing water at least from the first vessel whereby access at least to said first vessel is provided, increasing the buoyancy of the first vessel, increasing the effective length of the guide lines whereby the second end of said first vessel is guided upwardly to the water surface, and then floating the first vessel away from the point above said second vessel.

7. Apparatus for completing and servicing a well below the surface of a body of water and penetrating a subsurface earth interval and having a surface pipe extending above the water bottom but below the water surface which comprises a first vessel fixedly and sealingly attached by its lower end to the upper end of the surface pipe adapted to enclose well head equipment attached to the upper end of said surface pipe, said first vessel having its upper end extending below the water vessel, a vertically arranged elongated second vessel having openings on its upper and lower ends releasably and sealingly attached by its lower end to the upper end of the first vessel, said second vessel being of sufficient length to extend with its upper end above the water surface and being provided with means in its upper end for access thereto by workmen, said apparatus being provided with flexible guide means connected to said vessels and extending through said second vessel for positioning said second vessel on said first vessel, the upper end of the first vessel and the lower end of the second vessel having matingly engaging conical surfaces, and differential pressure sealing means attached exteriorly to the lower end of the second vessel for engagement with the upper end of the first vessel and exposed to the hydrostatic head of water for releasably attaching and sealing between said vessels.

8. Apparatus for completing and servicing a well below the surface of a body of water and penetrating a subsurface earth interval and having a surface pipe extending above the water bottom but below the water surface which comprises a first vessel fixedly and sealingly attached by its lower end to the upper end of the surface pipe adapted to enclose well head equipment attached to the upper end of said surface pipe, said first vessel having its upper end extending below the water surface, a vertically arranged elongated second vessel having openings on its upper and lower ends releasably and sealingly attached by its lower end to the upper end of the first vessel, said second vessel being of sufficient length to extend with its upper end above the water surface and being provided with means in its upper end for access thereto by workmen, said apparatus being provided with flexible and extensible guide means connected to said vessels and extending through said second vessel for positioning said second vessel on said first vessel, the upper end of the first vessel and the lower end of the second vessel having matingly engaging conical surfaces and a cup-shaped differential pressure sealing means exposed to the hydrostatic head of water attached exteriorly to said conical surface on the lower end of the second vessel for engagement with the conical surface on the upper end of the first vessel and thereby releasably attaching and sealing between said vessels.

9. Apparatus for completing and servicing a well below the surface of a body of water and penetrating a subsurface earth interval and having a surface pipe extending above the water bottom but below the water surface which comprises a first vessel fixedly and sealingly attached by its lower end to the upper end of the surface pipe adapted to enclose well head equipment attached to the upper end of said surface pipe, said first vessel having its upper end extending below the water surface, a vertically arranged elongated second vessel having openings on its upper and lower ends releasably and sealingly attached by its lower end to the upper end of the first vessel, said second vessel being of sufficient length to extend with its upper end above the water surface and being provided with means in its upper end for access thereto by workmen, said apparatus being provided with flexible and extensible guide means connected to said vessels and extending through said second vessel for positioning said second vessel on said first vessel, the upper end of the first vessel having an inwardly projecting conical surface and the lower end of the second vessel having an outwardly projecting conical surface, said outwardly projecting conical surface resting on said inwardly projecting conical surface when the second vessel is positioned on the first vessel, and differential pressure sealing means attached exteriorly to the lower end of the second vessel for engagement with the upper end of the first vessel and exposed to the hydrostatic head of water for releasably attaching and sealing between said vessels.

10. Apparatus for completing and servicing a well below the surface of a body of water and penetrating a subsurface earth interval and having a surface pipe extending above the water bottom but below the water surface which comprises a first vessel fixedly and sealingly attached by its lower end to the upper end of the surface pipe adapted to enclose well head equipment attached to the upper end of said surface pipe, said first vessel having its upper end extending below the water surface, a vertically arranged elongated second vessel having openings on its upper and lower ends releasably and sealingly attached by its lower end to the upper end of the first vessel, said second vessel being of sufficient length to extend with its upper end above the water surface and being provided with means in its upper end for access thereto by workmen, said apparatus being provided with flexible and extensible guide means connected to said vessels and extending through said second vessel for positioning said second vessel on said first vessel, the upper end of the first vessel having an inwardly projecting conical surface and the lower end of the second vessel having an outwardly projecting conical surface, the first vessel being provided on its upper end with an upstanding annular member forming a continuation of its outer wall, said outwardly projecting conical surface resting on said inwardly projecting conical surface when the second vessel is positioned on the first vessel, and differential pressure sealing means attached exteriorly to the lower end of the second vessel for engagement with the upper end of the first vessel and exposed to the hydrostatic head of water for releasably attaching said vessels and for sealing between the outwardly and inwardly projecting surfaces and the upstanding annular member.

11. Apparatus for completing and servicing a well below the surface of a body of water and penetrating a subsurface earth interval and having a surface pipe extending above the water bottom but below the water surface which comprises a first vessel fixedly and sealingly attached by its lower end to the upper end of the surface pipe adapted to enclose well head equipment attached to the upper end of said surface pipe, said first vessel having its upper end extending below the water surface, a vertically arranged elongated second vessel having openings on its upper and lower ends releasably and sealingly attached by its lower end to the upper end of the first vessel, said second vessel being of sufficient length to extend with its upper end above the water surface and being provided with means in its upper end for access thereto by workmen, said apparatus being provided with flexible and extensible guide means connected to said vessels and extending through said second vessel for positioning said second vessel on said first vessel, the upper end of the first vessel having an inwardly projecting conical surface and the lower end of the second vessel having an outwardly projecting conical surface, an upstanding annular member on the upper end of the first vessel forming a continuation of its outer wall, an annular conical member forming said inwardly projecting surface of said first vessel having an inner annular wall, a depending annular member on the lower end of the second vessel positioned within the inner annular wall of the annular conical member, said outwardly projecting conical surface resting on said inwardly projecting conical surface when the second vessel is positioned on the first vessel, and differential pressure sealing means attached exteriorly to the lower end of the second vessel for engagement with the upper end of the first vessel and exposed to the hydrostatic head of water for releasably attaching said vessels and for sealing between the outwardly and inwardly projecting surfaces and the upstanding annular member.

12. Apparatus for completing and servicing a well below the surface of a body of water and penetrating a subsurface earth interval and having a surface pipe extending above the water bottom but below the water surface which comprises a first vessel fixedly and sealingly attached by its lower end to the upper end of the surface pipe adapted to enclose well head equipment attached to the upper end of said surface pipe, said first vessel having its upper end extending below the water surface, a vertically arranged elongated second vessel having openings on its upper and lower ends releasably and sealingly attached by its lower end to the upper end of the first vessel, said second vessel being of sufficient length to extend with its upper end above the water surface and being provided with means in its upper end for access thereto by workmen, said apparatus being provided with flexible and extensible guide means connected to said vessels and extending through said second vessel for positioning said second vessel on said first vessel, means on said second vessel for controlling the length of said flexible and extensible guide means, the upper end of the first vessel and the lower end of the second vessel having matingly engaging conical surfaces, and a cup-shaped differential pressure sealing means attached exteriorly to the lower end of the second vessel for engagement with the upper end of the first vessel and exposed to the hydrostatic head of water for releasably attaching and sealing between said vessels.

13. For drilling and completing a well in which a buoyant first elongated vessel is placed in a vertical position on a submerged second vessel on bottom of a body of water, the first vessel being open on both ends, the method which comprises floating the first vessel in a horizontal position to a point generally above said second vessel, decreasing the buoyancy of the first vessel adjacent one end, guiding said one end of the first vessel downwardly to a vertical position over the second vessel while decreasing buoyancy of the other end whereby the first vessel has said one end releasably placed on the second vessel with its other end extending above the water surface, removing water from said vessels, and then drilling and completing a well through said vessels while maintaining said vessels in place.

14. For flexibly attaching and sealing first and second vessels on bottom of a body of water, said first vessel having an open upper end, the second vessel having open first and second ends and being provided with a flexible sealing member on the outer surface of its first end, the method which comprises placing said first vessel fixedly on bottom of said body of water, floating the second vessel in a horizontal position to a point generally above said first vessel, decreasing the buoyancy of the second vessel adjacent the first end, flexibly guiding said first end downwardly over the upper end of said second vessel while decreasing buoyancy of the second end, matingly engaging the upper end of the first vessel with the first end of the second vessel such that the flexible sealing member engages with an outer sealing surface on the upper end of said first vessel, and then removing water from said vessels whereby a seal is effected between said vessels by differential pressure exerted by the hydrostatic head of water contacting said flexible sealing member and said vessels are sealingly and flexibly attached to each other.

15. Apparatus in accordance with claim 1 in which the second vessel is provided with guide means on its interior wall through which said flexible guide connections are arranged.

16. Apparatus in accordance with claim 7 in which the second vessel is provided with guides on its interior wall adjacent the lower end through which said flexible guide means are arranged.

References Cited in the file of this patent

UNITED STATES PATENTS

| | | |
|---|---|---|
| 2,051,926 | Weiner | Aug. 23, 1936 |
| 2,171,672 | Plummer | Sept. 5, 1939 |
| 2,187,871 | Voorhees | Jan. 23, 1940 |
| 2,534,480 | Shannon | Dec. 19, 1950 |
| 2,606,003 | McNeill | Aug. 5, 1952 |
| 2,684,575 | Pryor et al. | July 27, 1954 |
| 2,691,272 | Townsend et al. | Oct. 12, 1954 |
| 2,717,651 | Rohrback | Sept. 13, 1955 |
| 2,783,027 | Gilbert | Feb. 26, 1957 |
| 2,783,970 | Gillespie | Mar. 5, 1957 |
| 2,854,215 | Cox et al. | Sept. 30, 1958 |